US011050316B2

(12) United States Patent
Yoneoka et al.

(10) Patent No.: US 11,050,316 B2
(45) Date of Patent: Jun. 29, 2021

(54) AXIAL GAP TYPE ROTATING ELECTRIC MACHINE

(71) Applicant: Hitachi Industrial Equipment Systems Co., Ltd., Tokyo (JP)

(72) Inventors: Yasuei Yoneoka, Tokyo (JP); Shuuichi Takahashi, Tokyo (JP); Toshifumi Suzuki, Tokyo (JP); Katsuyuki Yamazaki, Tokyo (JP); Daisaku Takahashi, Tokyo (JP); Daisuke Kurai, Tokyo (JP); Jun Sakurai, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 338 days.

(21) Appl. No.: 16/099,937

(22) PCT Filed: Jan. 27, 2017

(86) PCT No.: PCT/JP2017/002846
§ 371 (c)(1),
(2) Date: Nov. 8, 2018

(87) PCT Pub. No.: WO2018/138853
PCT Pub. Date: Aug. 2, 2018

(65) Prior Publication Data
US 2019/0157935 A1    May 23, 2019

(51) Int. Cl.
*H02K 11/00*    (2016.01)
*H02K 3/52*    (2006.01)
(Continued)

(52) U.S. Cl.
CPC ............. *H02K 3/522* (2013.01); *H02K 1/146* (2013.01); *H02K 3/18* (2013.01); *H02K 3/325* (2013.01);
(Continued)

(58) Field of Classification Search
CPC .................. H02K 21/24; H02K 3/18
See application file for complete search history.

(56) References Cited

U.S. PATENT DOCUMENTS 6,590,310 B2 *    7/2003    Takano .................. H02K 3/522
29/596
6,936,942 B1 *    8/2005    Okazaki ............... B62D 5/0403
310/71
(Continued)

FOREIGN PATENT DOCUMENTS

EP    1 729 396 A1    12/2006
EP    3 460 690 A1    3/2019
(Continued)

OTHER PUBLICATIONS

Extended European Search Report issued in European Application No. 17894035.9 dated Jul. 21, 2020 (13 pages).
(Continued)

*Primary Examiner* — Alexander Talpalatski
(74) *Attorney, Agent, or Firm* — Crowell & Moring LLP

(57) ABSTRACT

There is provided an axial gap rotary electric machine which includes a stator in which a plurality of core units, the core units having a core, a winding disposed in an outer periphery of the core, and a bobbin disposed between the core and the winding, are arranged in an annular shape about a rotation shaft, at least one rotor which faces an end surface of the core in an axial direction through a gap, a rotation shaft which rotates together with the rotor, and a housing in which the stator and the rotor are stored. A wiring fixing member is provided in an end surface and on an outer side of the stator in the axial direction, and includes an outer wall and an inner wall extending in a circumferential direction along a circumferential outer shape of the stator. The stator includes a crossover wire which leads the winding from the core unit. The crossover wire is disposed between the outer wall and the inner wall of the wiring fixing member. At least a part of the end surface of the inner wall on a side near the stator in the axial direction abuts on the bobbin.

7 Claims, 12 Drawing Sheets

(51) Int. Cl.
    *H02K 1/14*     (2006.01)
    *H02K 3/18*     (2006.01)
    *H02K 16/02*     (2006.01)
    *H02K 21/24*     (2006.01)
    *H02K 3/32*     (2006.01)
    *H02K 3/50*     (2006.01)

(52) U.S. Cl.
    CPC ............... *H02K 3/50* (2013.01); *H02K 16/02* (2013.01); *H02K 21/24* (2013.01); *H02K 2203/06* (2013.01); *H02K 2203/12* (2013.01)

(56) References Cited

U.S. PATENT DOCUMENTS

| | | | | |
|---|---|---|---|---|
| 10,148,152 | B2 * | 12/2018 | King | F16C 19/163 |
| 10,164,493 | B2 * | 12/2018 | Honda | H02K 5/12 |
| 2006/0138883 | A1 * | 6/2006 | Yagai | H02K 3/522 |
| | | | | 310/71 |
| 2008/0106161 | A1 | 5/2008 | Matsuzaki et al. | |
| 2012/0293024 | A1 | 11/2012 | Yokogawa et al. | |
| 2014/0125167 | A1 * | 5/2014 | Marvin | H02K 15/045 |
| | | | | 310/64 |

FOREIGN PATENT DOCUMENTS

| | | | |
|---|---|---|---|
| JP | 2006-180618 | A | 7/2006 |
| JP | 2008-118833 | A | 5/2008 |
| JP | 2011-205877 | A | 10/2011 |
| WO | WO 2015/159332 | A1 | 10/2015 |

OTHER PUBLICATIONS

International Search Report (PCT/ISA/210) issued in PCT Application No. PCT/JP2017/002846 dated Apr. 25, 2017 with English translation (two (2) pages).

Japanese-language Written Opinion (PCT/ISA/237) issued in PCT Application No. PCT/JP2017/002846 dated Apr. 25, 2017 (four (4) pages).

* cited by examiner

AXIAL GAP TYPE ROTATING ELECTRIC MACHINE

TECHNICAL FIELD

The present invention relates to an axial gap rotary electric machine, and particularly to a member which is used to fix a wiring in a housing.

BACKGROUND ART

An axial gap rotary electric machine is considered to be suitable to a thin flat fan structure compared to a radial gap rotary electric machine which is normally used. In the rotary electric machine, since a winding approaches the housing (the inner periphery), a crossover wire led out of the winding of a stator is disposed on an outer side in the radial direction of a rotor in many cases. The crossover wire is also desirably molded with a core and the winding with resin so as not to move. In order to improve torque and efficiency in the axial gap rotary electric machine, it is important to increase an area of the magnet (that is, a cross section of a magnetic path). Specifically, it is desirable to increase an area where a rotor magnet and the stator face each other in a limited inner diameter of the housing.

Therefore, an electric wire (lead wire) led out of the stator winding and the crossover wire connected to the lead wire are limited in layout space, and thus disposed on an outer side in the radial direction of the rotor in many cases. When the crossover wire protrudes from the space, there may be caused a damage due to an interference to the rotor, and an insulation failure due to contact with the housing. Therefore, the crossover wire is necessarily fixed and protected in order to secure an insulation performance with respect to the housing and the winding, and to avoid the interference to the rotor.

As a countermeasure of solving the problem, for example, Patent Literature 1 discloses an electric motor of an axial air gap type. The electric motor includes a crossover wire processing unit which is disposed on an outer side of an end surface of an insulator of a core unit and extends in an axial direction. On the outer side in the radial direction of the crossover wire processing unit, there are provided a plurality of support grooves which extend in a rotation direction to dispose the crossover wire. The crossover wire of each core unit is supported through the adjacent crossover wire processing units.

CITATION LIST

Patent Literature

PATENT LITERATURE 1: JP-A 2008-118833

SUMMARY OF INVENTION

Technical Problem

In the rotary electric machine disclosed in Patent Literature 1, a groove (the crossover wire processing unit) is provided in the upper portion in the axial direction on an outer side of a bobbin flange in order to support the crossover wire. However, in Patent Literature 1, the support groove is about half as long as a circumferential length of the bobbin. In a portion where there is no support groove between bobbins, there is a concern that the crossover wire protrudes toward the inner side in the radial direction.

In addition, Patent Literature 1 is configured such that the crossover wire processing unit is disposed in each core unit. Therefore, a separation distance between the adjacent crossover wire processing units is increased. In such a configuration, the crossover wire is linearly disposed between the crossover wire processing units, and accordingly the crossover wire is located on the inner side in the radial direction in proportion to that layout. When the crossover wire is linearly disposed between the adjacent crossover wire processing units, the crossover wire forms a polygonal region. In the case of a resin mold stator in which the crossover wire processing unit and the crossover wire are integrally molded by resin together with the core unit, there is a problem in that only a resin die inscribed in the polygonal region can be used. In other words, there is a problem that the rotor is limited in diameter which is disadvantageous to performance or miniaturization. In addition, if a resin die equal to or larger than the polygonal region is used in order to solve the problem, the crossover wire may be damaged when the resin die is inserted or removed.

Further, the crossover wire processing unit of Patent Literature 1 is formed in a column shape having a small ratio of the diameter compared to the layout distance of the crossover wire, and accordingly an area of the groove engaged with the crossover wire is also small. There is a concern that the crossover wire may fall out of the groove by a sealing pressure at the time of working or resin molding. There is also a concern that the workability is reduced and the crossover wire is damaged.

An object of the invention is to provide an axial gap rotary electric machine which is able to achieve reliability of the crossover wire and space saving of the layout region.

Solution to Problem

In order to solve the above problems, the configurations disclosed in claims are employed for example. The present application includes a plurality of solutions of the above problems. According to an example of the present application, there is provided an axial gap rotary electric machine. The axial gap rotary electric machine includes a stator in which a plurality of core units, the core units having a core, a winding disposed in an outer periphery of the core, and a bobbin disposed between the core and the winding, are arranged in an annular shape about a rotation shaft, at least one rotor which faces an end surface of the core in an axial direction through a gap, a rotation shaft which rotates together with the rotor, and a housing in which the stator and the rotor are stored. A wiring fixing member is provided in an end surface and on an outer side of the stator in the axial direction, and includes an outer wall and an inner wall extending in a circumferential direction along a circumferential outer shape of the stator. The stator includes a crossover wire which leads the winding from the core unit. The crossover wire is disposed between the outer wall and the inner wall of the wiring fixing member. At least a part of the end surface of the inner wall on a side near the stator in the axial direction abuts on the bobbin.

Advantageous Effects of Invention

According to an aspect of the invention, it is possible to save space of a layout region of a crossover wire, increase output power and efficiency of an axial gap rotary electric machine, and minimize the axial gap rotary electric machine in size.

Other objects, configurations, and effects of the invention can be apparently known from the following description.

DESCRIPTION OF EMBODIMENTS

Hereinafter, embodiment of the invention will be described using the drawings.

First Embodiment

Figure 1:
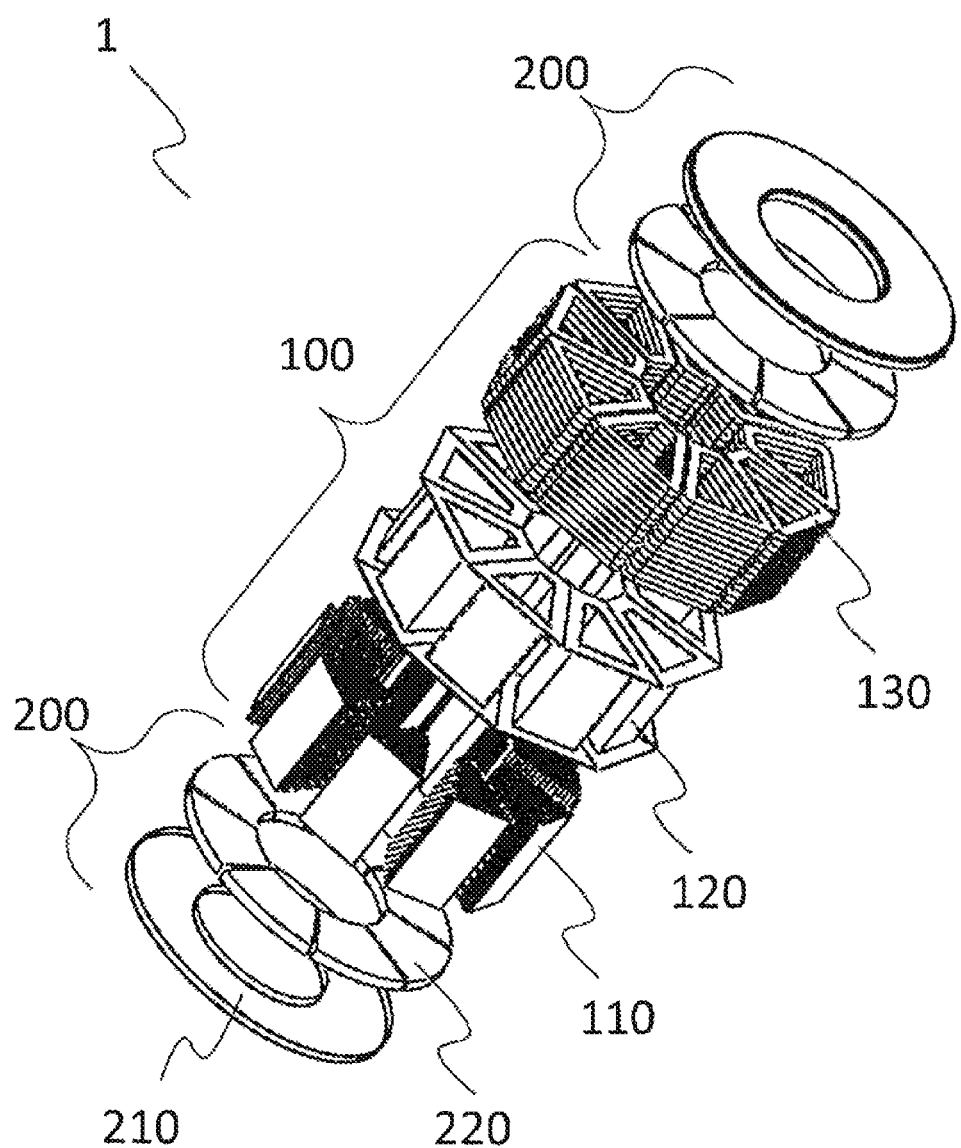
FIG. 1 is an exploded perspective view illustrating an exemplary structure of an axial gap rotary electric machine.
Figure 2:
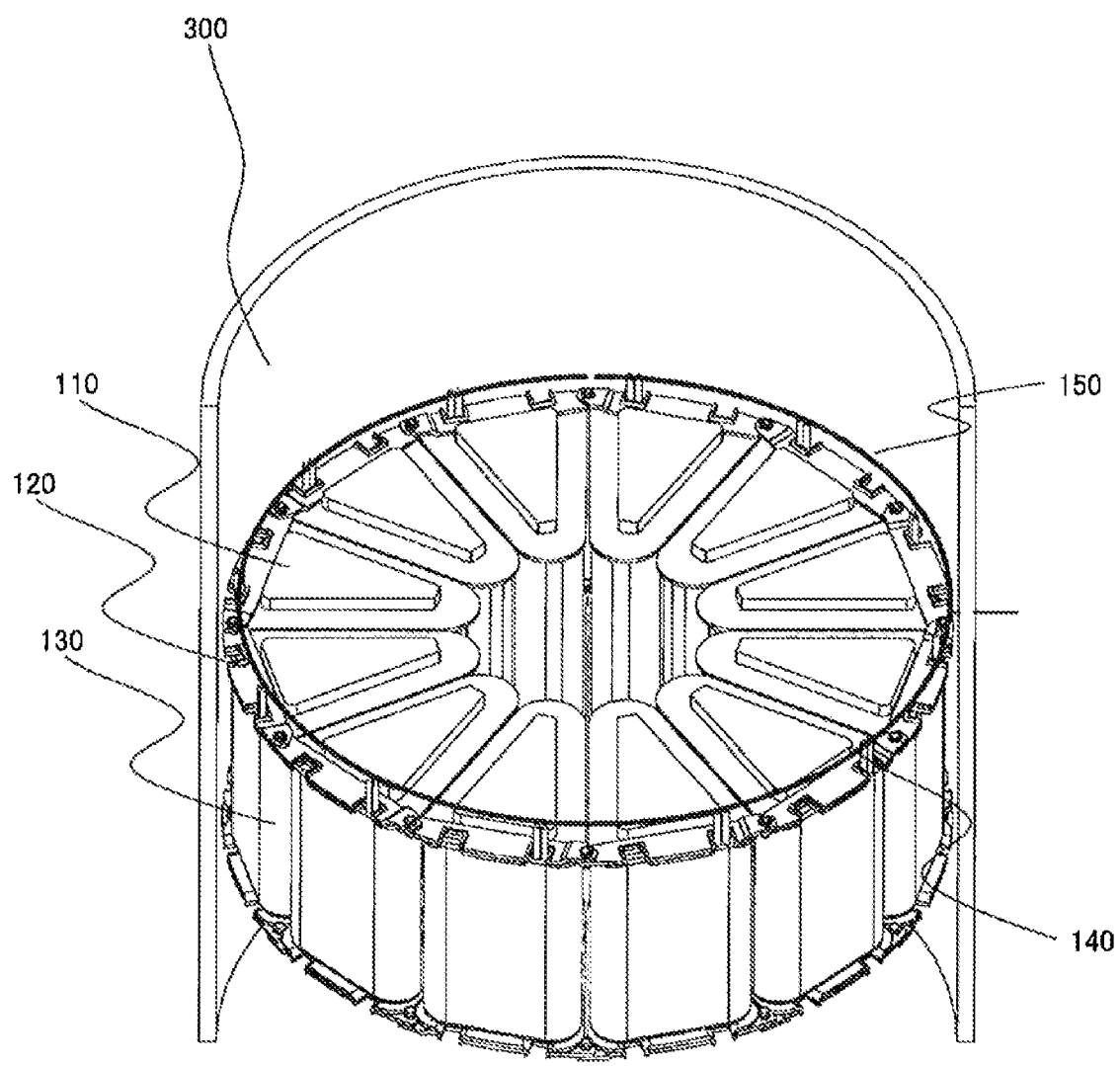
FIG. 2 is a perspective view illustrating an example of a stator of the axial gap rotary electric machine.

First, a structure of an axial gap electric motor will be described using FIGS. 1 and 2. FIG. 1 is an exploded perspective view of a stator and a rotor of an axial gap electric motor. FIG. 2 is an enlarged perspective view illustrating the stator.

A stator 100 is configured such that an iron core 110 serving as a core is inserted to a bobbin 120. A plurality of core units, each of which is wound with a coil 130 around the bobbin 120, is arranged in an annular shape. A rotor 200 is structured such that a magnet 220 is attached to a rotor yoke 210, and an exposed surface of the magnet 220 and the end surface of the stator 100 face each other with the stator 100 interposed with a predetermined gap.

At this time, the coil 130 wound around the bobbin 120 is led out to one end surface of the stator 100 in an axial direction. The wire (a lead wire 140) led out of the coil 130 is electrically connected to a crossover wire 150 which goes around the outermost peripheral part of the bobbin 120. The crossover wire 150 is led out of a hole (not illustrated) which is provided in a housing, and electrically connected to an external power source which supplies power to the coil. The number of crossover wires is normally as many as a multiplies of "3" in the case of a three-phase motor. In this embodiment, only one crossover wire is illustrated.

In a case where the electric motor having such a structure is manufactured, a diameter of the rotor may be made large by drawing the crossover wire in a shape similar to a circle. In addition, when the stator is inserted to the housing, there is a need to insert the stator without causing a damage on the lead wire 140 and the crossover wire 150. In addition, a mold die used in molding with resin, the rotor, and the wires thereof necessarily do not come into contact with the stator. Therefore, a structure of the axial gap electric motor to which the invention is applied in order to simply fix these wires will be described using FIGS. 3 and 4.

Figure 3:
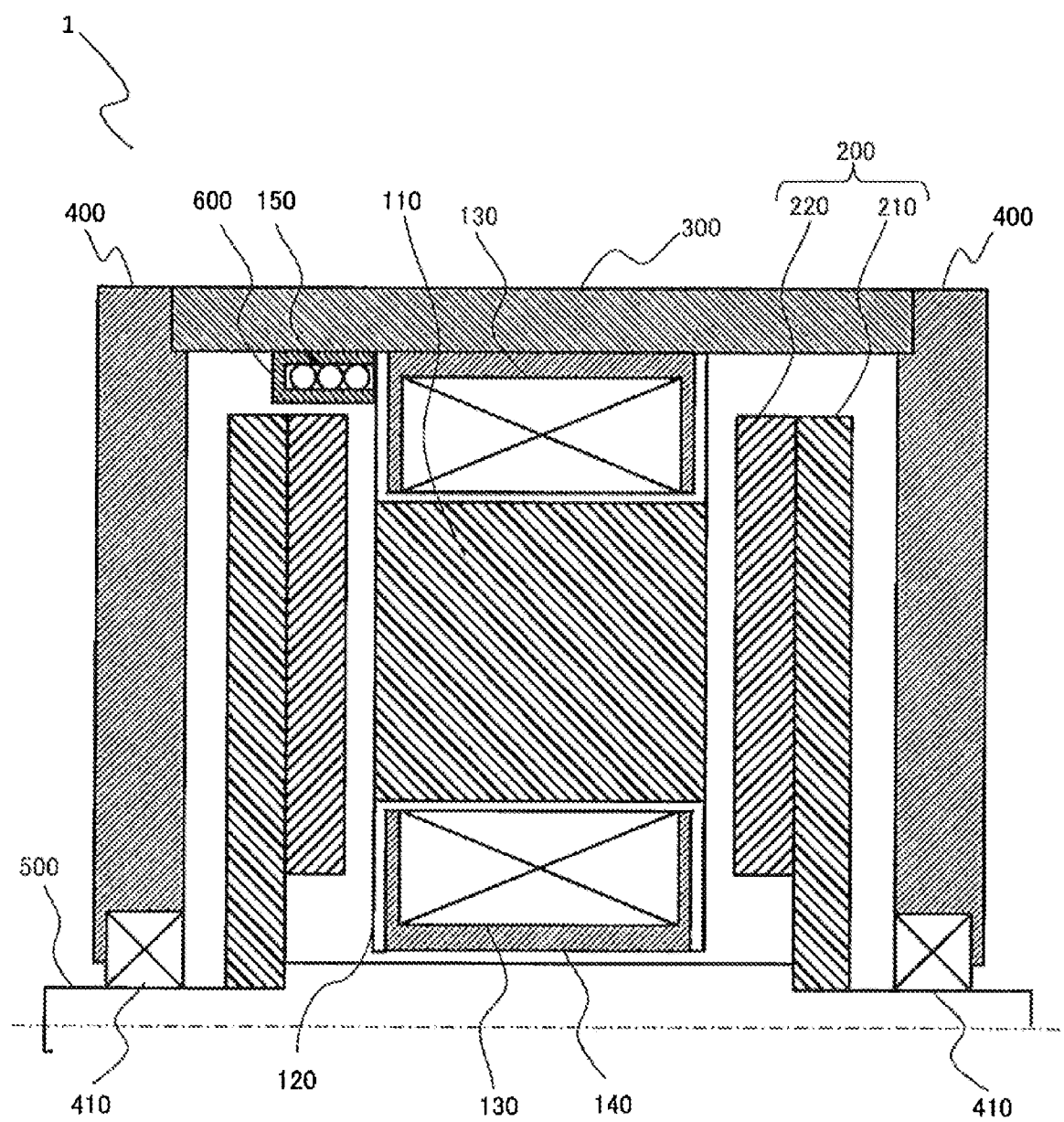
FIG. 3 is a cross-sectional view of the axial gap rotary electric machine according to a first embodiment to which the invention is applied when viewed in an axial direction.
Figure 4:
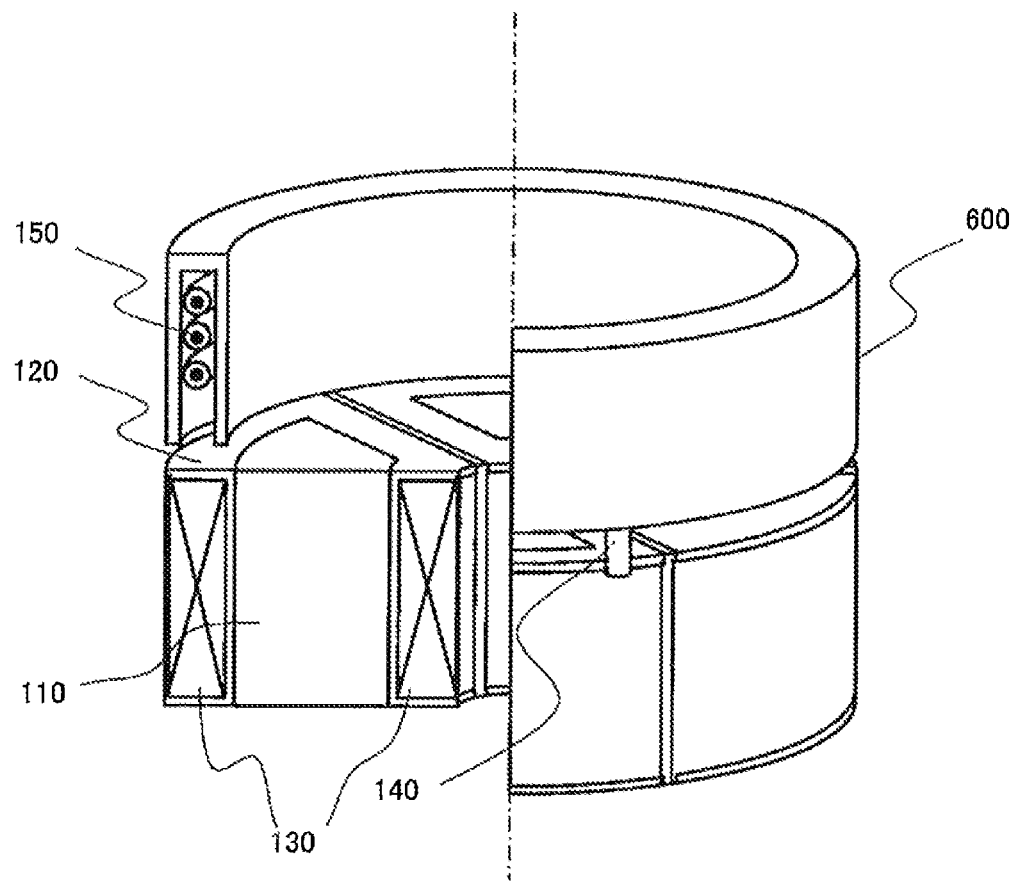
FIG. 4 is a conceptual diagram of a stator and a wiring fixing member of the axial gap rotary electric machine according to the first embodiment.

FIG. 3 illustrates a cross-sectional view of an axial gap electric motor 1 (hereinafter, simply referred to "electric motor 1") according to the first embodiment to which the invention is applied. FIG. 4 illustrates a conceptual diagram of the stator and a wiring fixing member of the axial gap electric motor 1 to which the invention is applied.

As illustrated in FIGS. 3 and 4, the electric motor 1 includes one stator 100 of a substantial annular shape and two disk-shaped rotors 200 which are disposed to interpose the stator in a rotating axial direction. The stator and the rotors are disposed to face each other with a predetermined gap in the axial direction.

The center portion of the rotor 200 is fixed to a shaft (rotation shaft) 500 to be rotated together. Portions on a load side and the opposite load side of the shaft 500 are supported to a bracket 400 through a bearing 410. The bracket 400 is fixed to the end portion of a substantially cylindrical housing 300 near an outer portion through a bolt or the like. In the embodiment, the motor housing 300 will be described as an example of the housing of the electric motor 1. However, any housing integrated to other applications may also be used as the housing of the electric motor 1.

The rotor 200 includes the rotor base 210 and the magnet 220. The base 210 serves as a base of the rotor 200, and is formed in a disk shape. A plurality of magnets 220 are fixed to one end surface of the base through an adhesive or a mechanical member. The base 210 may be made of a material serving as a rotor yoke. The magnet 220 is a permanent magnet. Various magnetics such as neodymium or ferrite may be applied according to a specification. As an example of the shape of the magnet 220, a blade shape is applied in a unit of one polarity. The adjacent magnets are disposed such that one surface in the axial direction has different polarity (S·N).

In the stator 100, a plurality ("6" in FIG. 4) of the core units, each of which is disposed with a winding 130 through the insulating bobbin 120 on the outer peripheral side of the iron core 110, are disposed in an annular shape about the shaft 500. In addition, in order to fix and insulate the annular stator 100 with respect to the housing 300, the stator 100 has a mold resin (not illustrated) which covers a portion between the adjacent core units and part or all of the inner and outer peripheral sides of the annular body and the end surface in the axial direction.

The crossover wire 150 which is led out of each core unit is disposed on the end surface on the opposite load side (the side of FIG. 3, the upper side of FIG. 4) of the stator 100 and the inner peripheral side of the housing 300 through a wiring fixing member 600). The winding 130, the lead wire 140, and the crossover wire 150 are desirably a coated wire.

In addition, in order to fix and insulate the annular stator 100 with respect to the wiring fixing member 600, and to fix and insulate these components with respect to the housing 300, the stator 100 has a mold resin which integrally covers a portion between the adjacent core units and part or all of the inner peripheral side of the annular body and the end surface in the axial direction.

Next, the wiring fixing member 600 will be described. The embodiment will be described about a structure in which the wiring fixing member 600 is provided in one end surface of the stator in the axial direction.

The lead wire 140 from the stator is led out to the end surface in the axial direction from the outer side in the radial direction of the bobbin of the stator as illustrated in FIG. 2, and connected to the crossover wire 150. The crossover wire 150 is inserted in the wiring fixing member 600 which is provided along the outer periphery of the stator. The wiring fixing member is formed in a shape to interpose the crossover wire 150 by a first wall (inner wall) on the inner side in the radial direction and a second wall (outer wall) on the outer side in the radial direction. The inner wall and the outer wall are connected to the upper portion of the wiring fixing member (the outer side in the rotation axial direction). The inner wall and the outer wall of the wiring fixing member are curved at almost the same curvature as the housing. At least a part of the end surface of the inner wall in the axial direction is supported by the wiring fixing member 600 by being brought into contact with a flange of the bobbin 120.

Figure 5A:
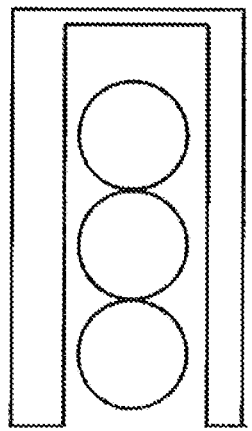
FIGS. 5A to 5E are cross-sectional views of the wiring fixing member according to the first embodiment.
Figure 5B:
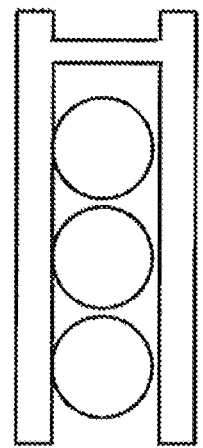
Figure 5C:
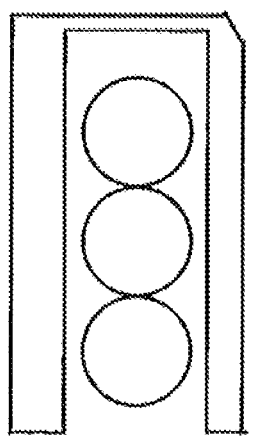
Figure 5D:
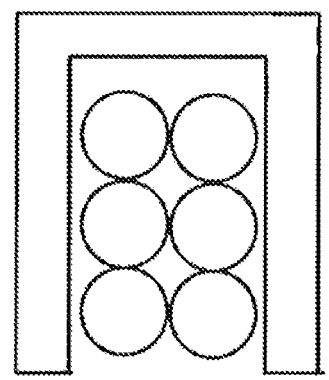
Figure 5E:
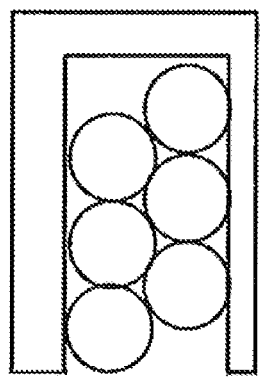
Figure 5E:
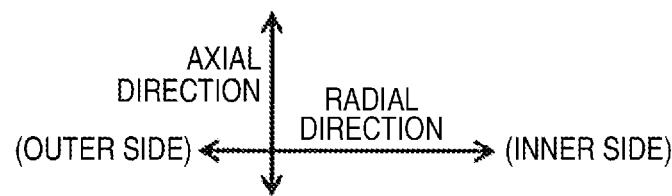

The cross section of the wiring fixing member 600 in the axial direction has a hollow portion of an approximate U shape as illustrated in FIG. 4. The crossover wire 150 is disposed in the hollow portion. The thicknesses of the inner wall and the outer wall (a length in the radial direction) may be equal as illustrated in FIG. 4. The thickness of the outer wall may be thick as illustrated in FIG. 5(a). In addition, the cross-sectional shape may be an approximate H shape as illustrated in FIG. 5(b). In addition, the shape hardly comes into contact with the mold die. Therefore, the angle of the upper portion of the inner wall may be reduced as illustrated in FIG. 5(c), or may be made round. The crossover wires between the inner wall and the outer wall may be arranged in a line in the axial direction, or may be in two lines, or may be overlapped in a staggered manner as illustrated in FIGS. 5(d) and 5(e).

Figure 6:
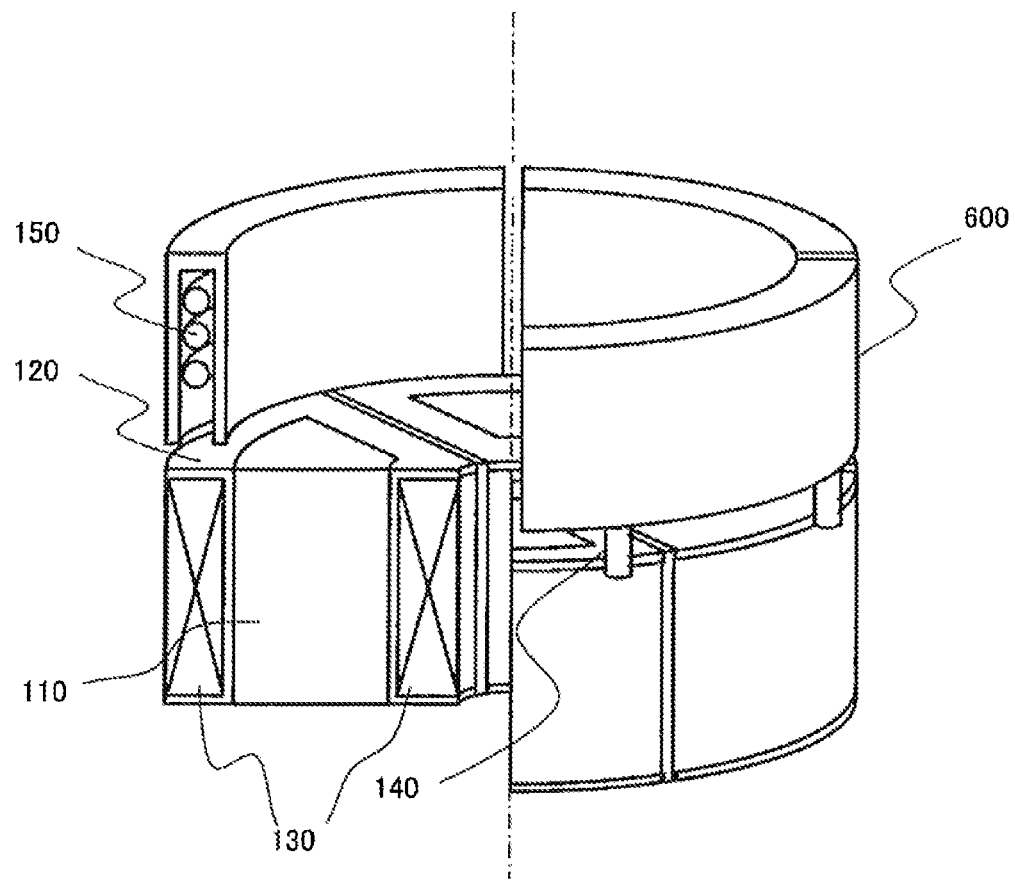
FIG. 6 is a conceptual diagram of the stator and the wiring fixing member of the axial gap rotary electric machine according to a modification of the first embodiment.

The wiring fixing member 600 of the embodiment is formed in a shape almost going around in a circumferential direction except near a lead portion 310 from which the crossover wire 150 is led out of the housing 300. However, the invention is not limited to the above configuration. The wiring fixing member 600 may be divided into plural pieces in the circumferential direction. For example, four wiring fixing members and six core units are provided in the circumferential direction in the example of FIG. 6. A workability in interposing the crossover wires in one wiring fixing member 600 is improved by disposing the plurality of wiring fixing members 600 in the circumferential direction. Further, the number of wiring fixing members 600 to be divided may be any number. In a case where the number of wiring fixing members 600 is smaller than the number of core units and a circumferential length of the wiring fixing member is longer than a circumferential length of the core unit, the number of components is not too increased, and thus the configuration does not complicated desirably. For example, the configuration may include twelve core units and six wiring fixing members 600. The number of core units and the number of wiring fixing members 600 are not necessarily in a relation of divisor, and may be determined by an angle for example. Specifically, three wiring fixing members 600 may be provided by 120 degrees, or four wiring fixing members 600 may be provided at every 90 degree section.

The material of the wiring fixing member 600 may be an insulator. The embodiment has been described about an example where a resin is used in view of reduction in size and weight.

Further, when the invention is implemented, the numbers of rotors and stators, and the positional relation are not necessarily to be the same as those of FIGS. 1 and 2. For example, the numbers of rotors and stators may be set to "1", or one rotor may be interposed between two stators.

Figure 7:
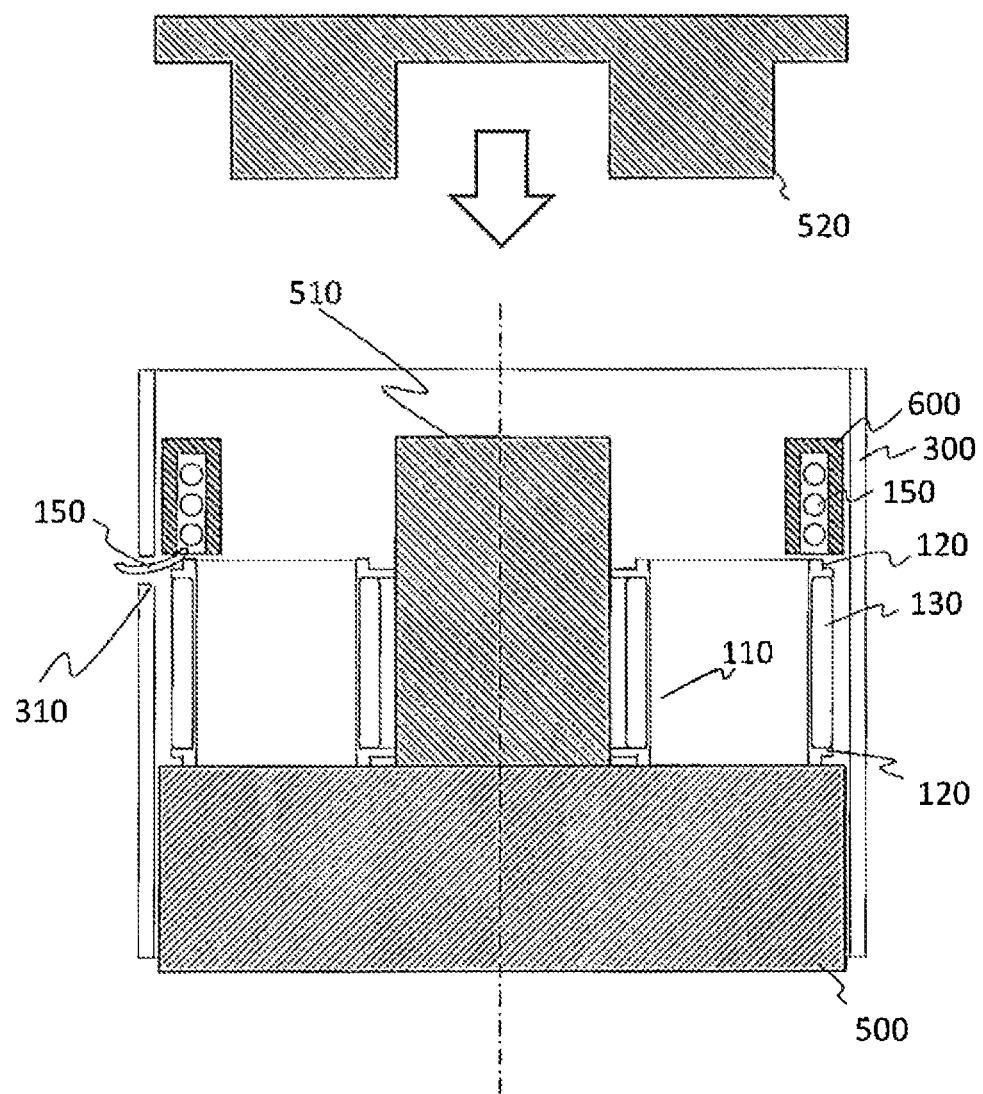
FIG. 7 is a diagram schematically illustrating a method of fixing the stator of the axial gap rotary electric machine according to the first embodiment.

Next, the axial gap electric motor 1 of the embodiment will be using FIG. 7 which is a schematic view in a case where the housing and the stator are molded.

First, the stator 100 in which the core units are disposed and the wiring fixing member 600 are placed on a lower die 500, and an inner diameter die 510 is inserted. Then, the housing 300 is placed thereon, and a stator upper die 520 is placed. Thereafter, resin flows from a gap (not illustrated) formed in the stator upper die 520, and integrally molds the stator 100 and the wiring fixing member 600. At this time, the crossover wire 150 is stored in the wiring fixing member, so that the upper die 520 can be inserted into the housing 300 without abutting on the upper die 520.

As described above, according to the electric motor 100 of the embodiment, the crossover wire 150 is interposed between the inner wall and the outer wall of the wiring fixing member 600, so that it is possible to prevent the wiring from projecting in the inner diameter, outer diameter, and axial directions of the crossover wire 150. Therefore, there is no concern that the crossover wire 150 may be dragged toward the inner side in the radial direction and come into contact with the inserting rotor. The diameter of the rotor can be made as large as up to the wiring fixing member 600. In addition, the wiring member 600 can be strongly fixed to the stator by resin.

Modifications

Further, the first embodiment has been described about an example where the stator 100 and the housing 300 are molded by resin, but the stator 100 and the housing 300 may be fixed by any method other than molding. For example, the adjacent core units may be configured to be fitted to each other. The core units arranged in an annular shape may be fixed to each other, and fixed to the housing 300 by an adhesive. The invention may be applied regardless of whether the stator 100 and the housing 300 are molded.

Second Embodiment

Figure 8:
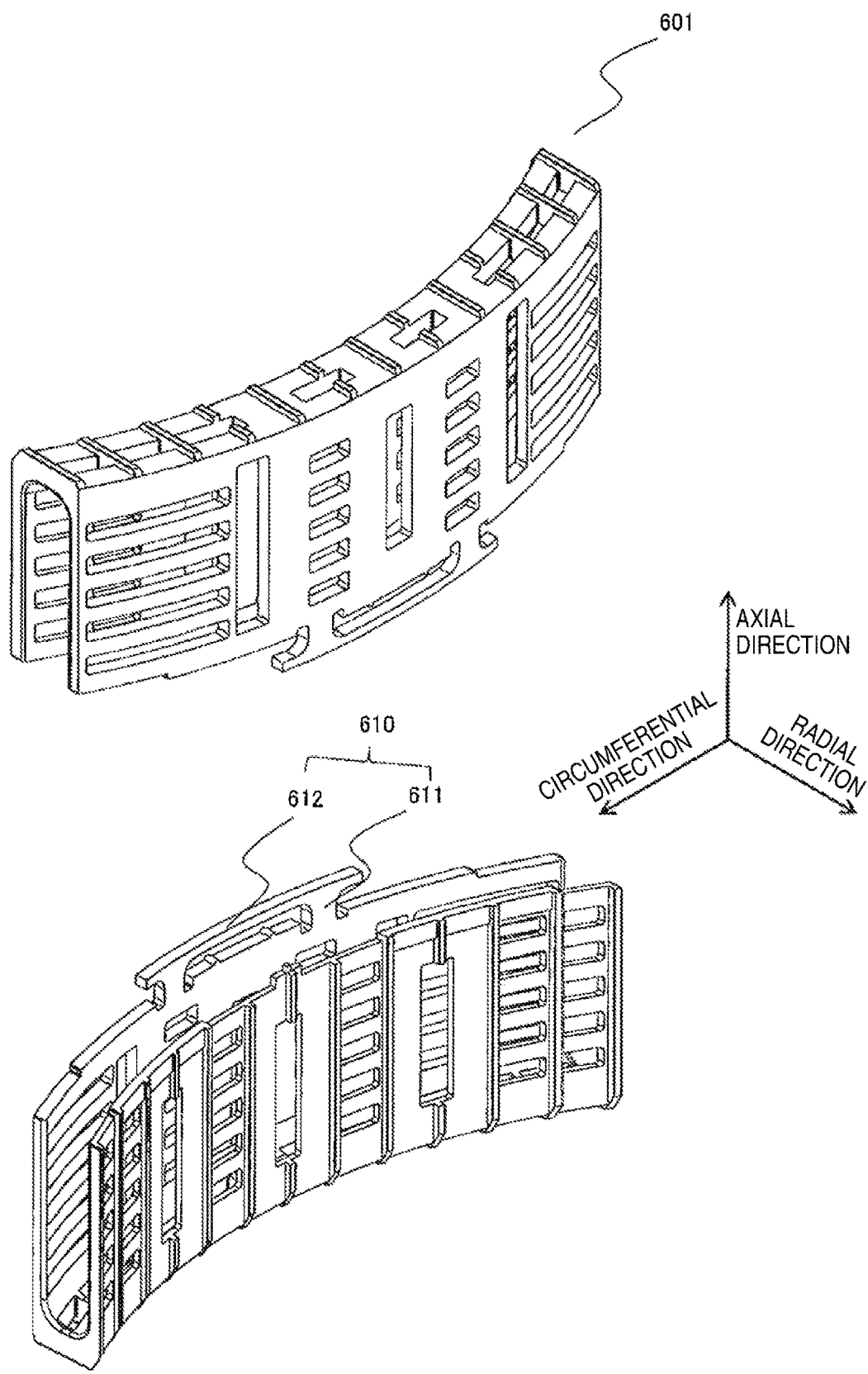
FIG. 8 is a perspective view of a wiring fixing member according to a second embodiment to which the invention is applied.

A wiring fixing member of a second embodiment to which the invention is applied will be described. FIG. 8 illustrates a wiring fixing member 601 of the second embodiment. The wiring fixing member 601 is molded with the crossover wire and the stator by resin. Therefore, there are provided a plurality of through holes in the inner wall, the outer wall, and the upper wall in order to easily insert the resin. In addition, a convex portion is formed even in the inner surface and the upper surface of the circumferential direction of the inner wall to extend in the axial direction or in the radial direction as a flow path of the mold resin. Since the convex portion comes into contact with the mold die, the flow path is formed in a portion between a flat portion which does not abut on the mold die and the mold die, and the mold resin easily wraps around.

Further, a projection 610 is provided in the end surface of the outer wall to extend in the axial direction. The projection 610 is configured by a projection shaft portion 611 which extends from the root on a side near the outer wall, and a projection engaging portion 612 which extends in a direction perpendicular to the projection shaft portion 611. A circumferential length of the projection engaging portion 612 may be larger than a circumferential length of the projection shaft portion 611. In the example of the wiring fixing member illustrated in FIG. 8, the engaging portion 612 is formed with a plurality of shaft portions 611.

Figure 9:
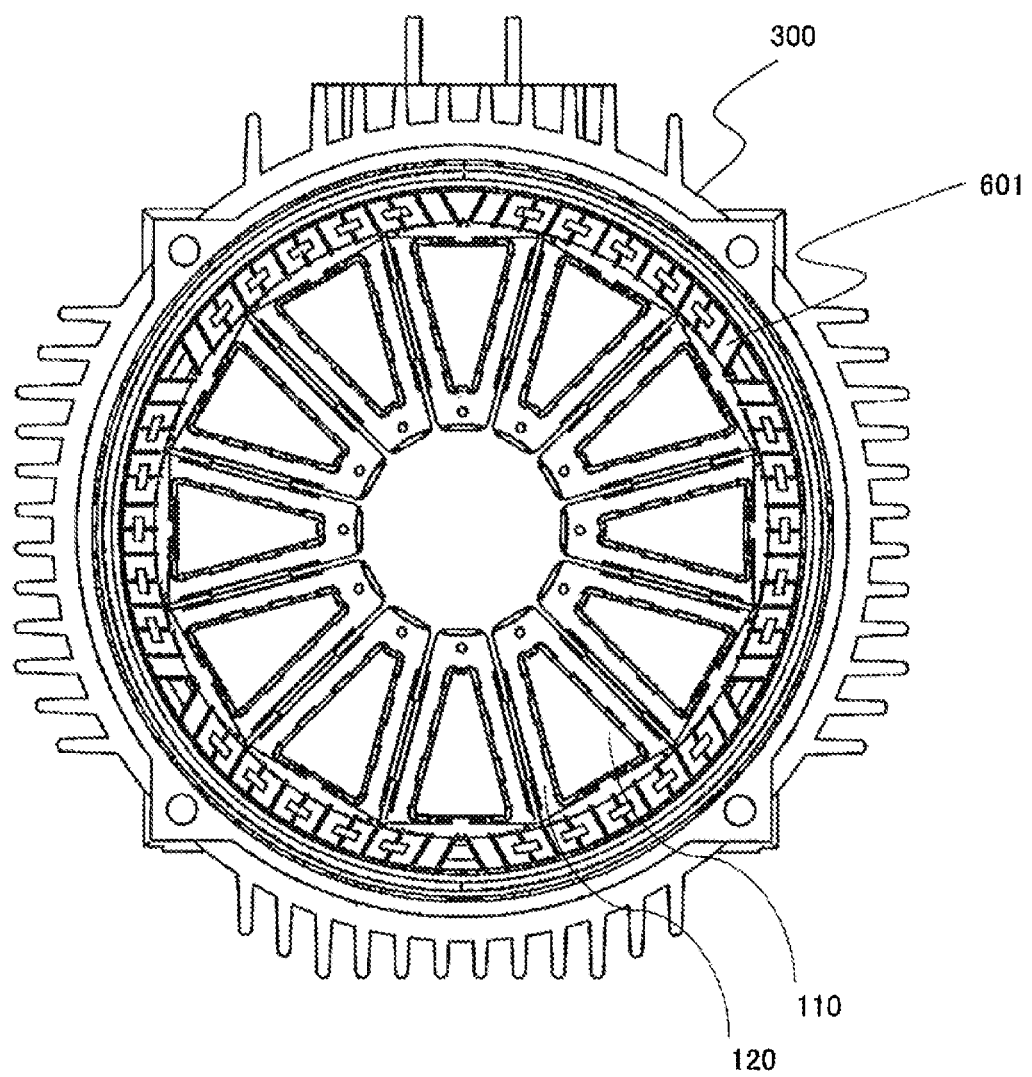
FIG. 9 is a diagram illustrating an inside of a housing according to the second embodiment when viewed from the axial direction.

FIG. 9 illustrated a diagram illustrating the inner portion of the housing in a state where the wiring fixing members 601 are arranged when viewed from the axial direction. As illustrated in the drawing, the wiring fixing members are arranged to go round.

Figure 10:
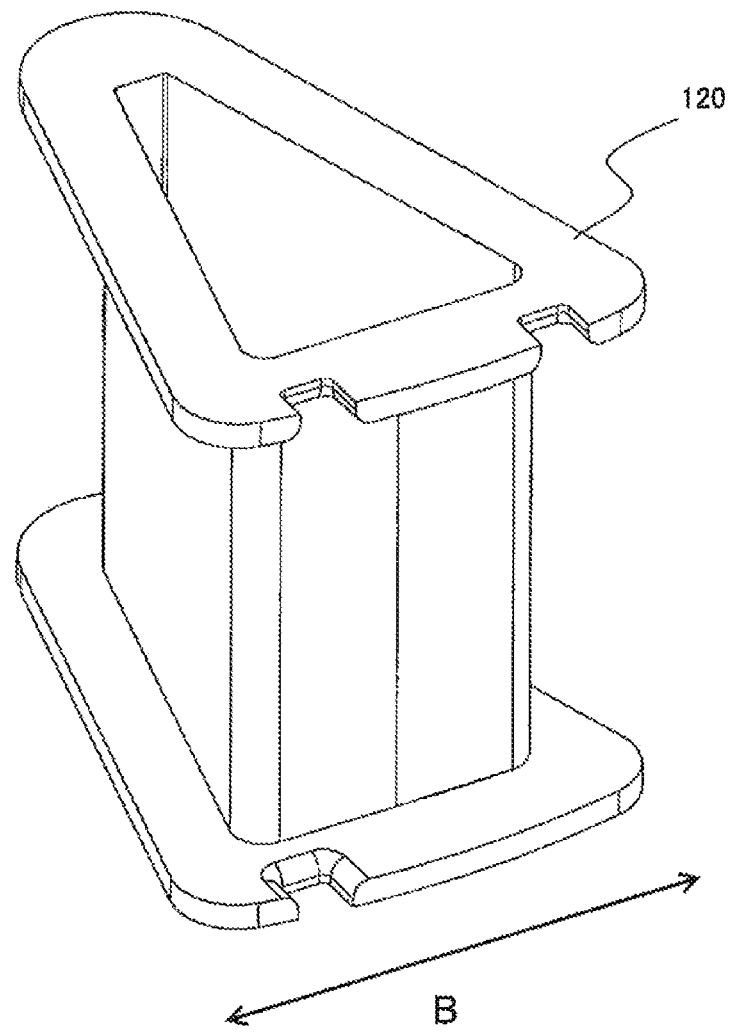
FIG. 10 is a perspective view illustrating an example of a bobbin of the axial gap rotary electric machine according to the second embodiment.
Figure 11A:
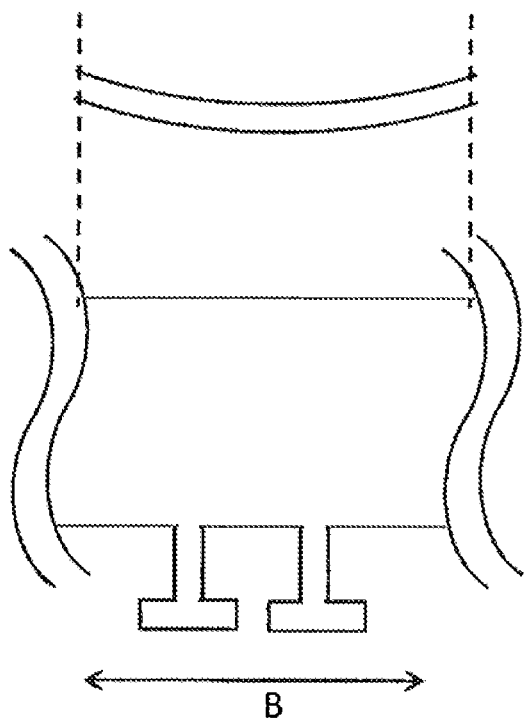
FIGS. 11A to 11D are top views and rear views illustrating the wiring fixing member according to the second embodiment.
Figure 11B:
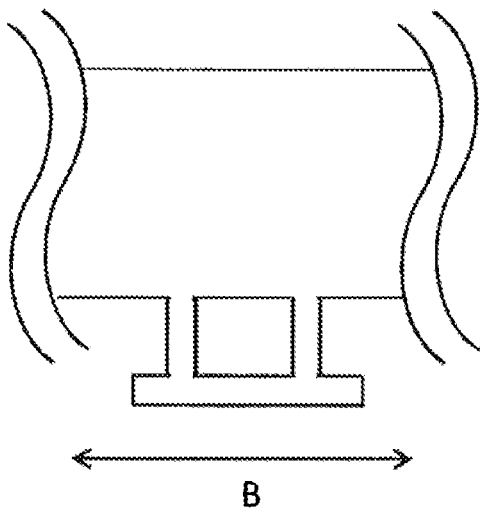
Figure 11C:
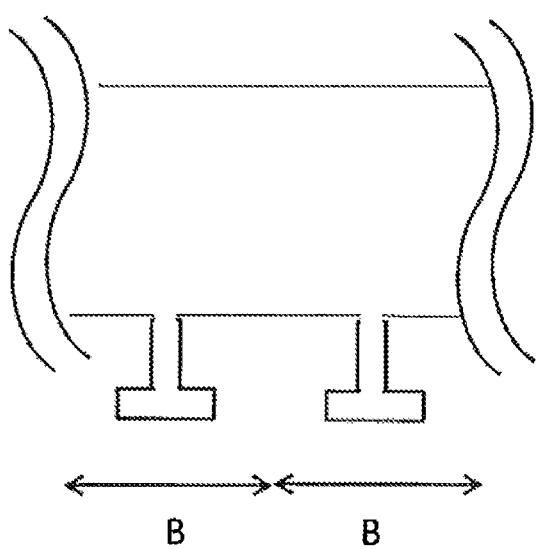
Figure 11D:
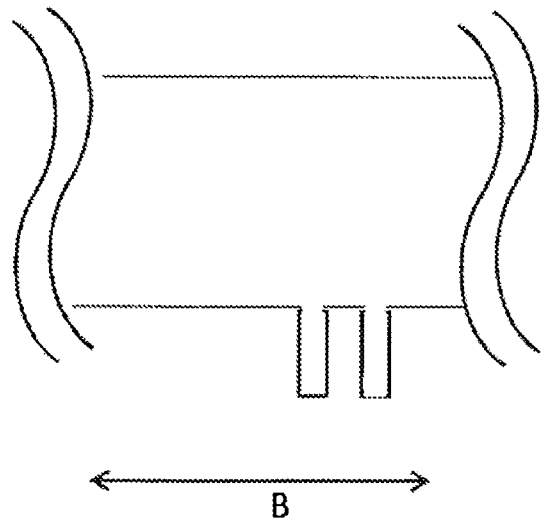

FIG. 10 illustrates a perspective view of the bobbin 120. In the bobbin 120 used in the stator of the second embodiment, there are formed notches in several places of the flange as illustrated in the drawing. The shaft portion 611 of the wiring fixing member 601 is fitted to the notch from the outside in the radial direction, so that the wiring fixing member 601 is fixed to the stator. With the engaging portion 612 in the projection 610, it is possible to reduce a concern that the wiring fixing member 601 is deviated from the axial direction. In the following explanation using FIG. 11, the outer circumferential length of the bobbin in FIG. 10 will be denoted by "B".

The projection 610 of the wiring fixing member 601 to which the invention is applied may be not necessarily formed in the shape of FIG. 8. FIG. 11 illustrates a modification of the projection 610.

FIG. 11(*a*) illustrates a top view and a rear view of the wiring fixing member 601 (diagrams viewed from the outside in the radial direction). The top views FIGS. 11(*b*) and 11(*c*) are similar to that of FIG. 11(*a*), and thus not illustrated. In addition, the width B of the bobbin 120 in the drawing is depicted for comparison. The wiring fixing member 601 of the second embodiment is provided with the projection 610 which extends in a direction from the lower side of the outer wall. The thickness of the projection 610 in the radial direction is set to be equal to the thickness of the outer wall of the wiring fixing member 601 to easily produce.

The shape of the projection 610 may be formed such that two T-shaped projections are provided and engaged in one bobbin as illustrated in FIG. 11(*a*). Alternatively, one projection engaging portion 612 may be connected to two shaft portions 611 as illustrated in FIG. 11(*b*). Alternatively, one projection 610 is provided in one bobbin as illustrated in FIG. 11(*c*), and the wiring fixing member 601 is provided in the notches of the plurality of bobbins.

Even when only the shaft portion 611 is provided without the engaging portion 612 as illustrated in FIG. 11(*d*), it is possible to achieve an effect of preventing the wiring fixing member 601 from being deviated from the circumferential direction.

The position of the projection 610 is not necessarily the center of the wiring fixing member 601, but may be freely set by a positional relation to the notch of the flange of the bobbin. For example, as illustrated in FIG. 11(*d*), the projection may be deviated from the center of the wiring fixing member 601, and may be deviated from the center of the flange of the bobbin.

In addition, at this time, the cross section of the wiring fixing member 601 is formed such that the outer wall is thicker than the inner wall as illustrated in FIGS. 5(*a*), 5(*c*), and 5(*e*) of the first embodiment, so that it is possible to secure a strength of the projection 610 compared to the other cases.

As described in the embodiment, it is possible to prevent the wiring fixing member from being deviated by providing the projection in the wiring fixing member 601.

Third Embodiment

In the first and second embodiments, the wiring fixing members having the same circumferential length have been described to be arranged without an interval. However, all the lengths of the wiring fixing members 601 used in one motor may be not necessarily equal. In a third embodiment to which the invention is applied, the description will be given about an example where the lengths of the wiring fixing members are different.

Figure 12:
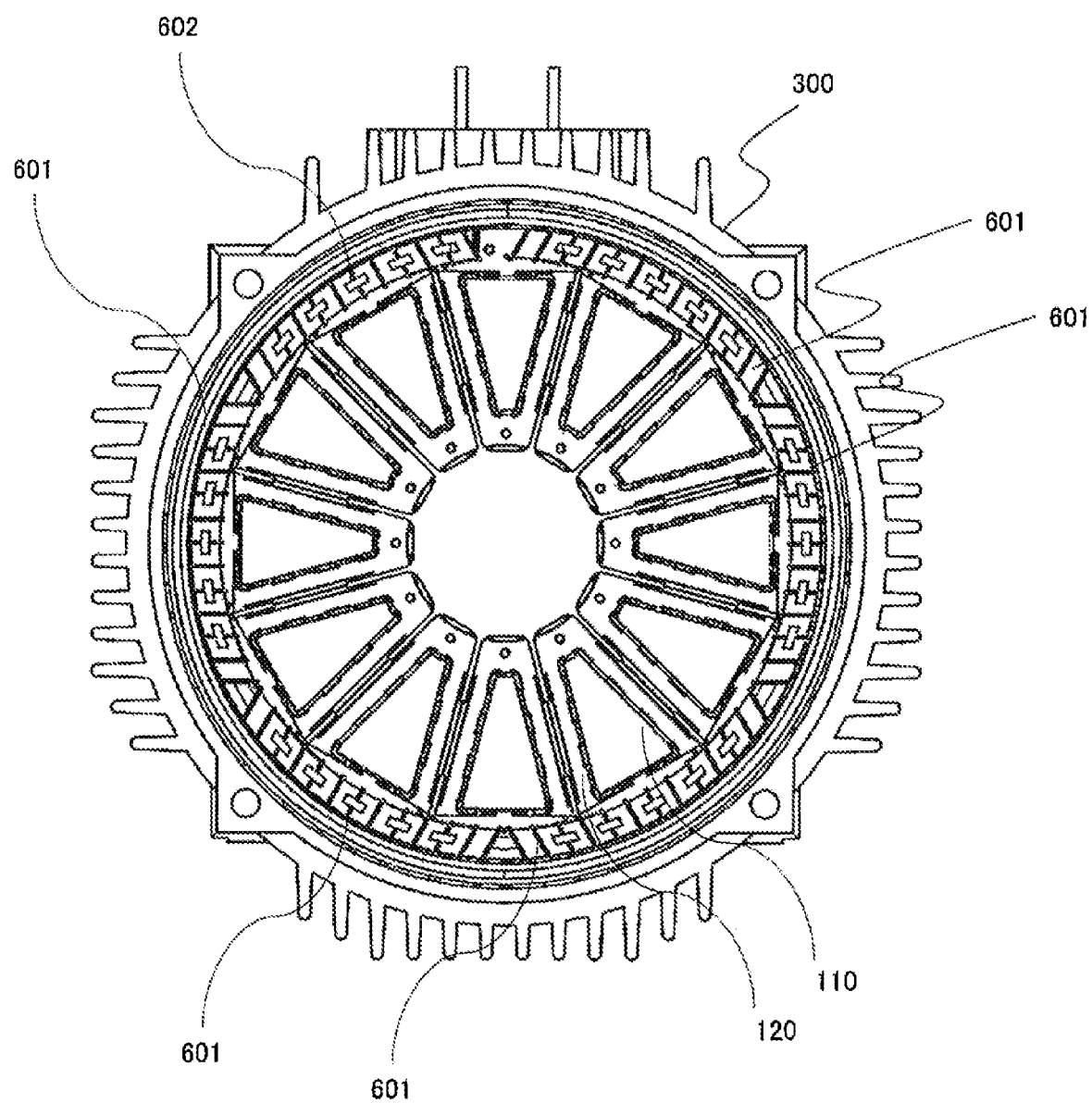
FIG. 12 is a diagram illustrating an inside of the housing according to a third embodiment to which the invention is applied when viewed from the axial direction.

FIG. 12 is a diagram illustrating the housing 300 when viewed from the axial direction. Only the wiring fixing member 602 on the left upper side of the drawing has a shorter circumferential length than the other wiring fixing members 601. However, similarly to the other examples, a circumferential length of the shortest wiring fixing member 602 is longer than a circumferential length of the core unit.

The reason why the circumferential length of the wiring fixing member 602 is short is to secure a space for leading out the crossover wire 150 from the lead portion 310 to the outside of the housing.

In this way, it is possible to improve a workability by using the plurality of wiring fixing members having different circumferential lengths.

Further, the rotary electric machine of the invention may be applied as an electric motor or a generator.

REFERENCE SIGNS LIST

100 stator
110 core
120 bobbin
130 coil
140 lead wire
150 crossover wire
200 rotor
210 rotor base
220 magnet
300 housing
301 leading hole of crossover wire
400 end bracket
410 bearing
500 lower die
510 inner diameter die
520 upper die
600, 601, 602 wiring fixing member

The invention claimed is:

1. An axial gap rotary electric machine, comprising:
a stator in which a plurality of core units, the core units having a core, a winding disposed in an outer periphery of the core, and a bobbin disposed between the core and the winding, are arranged in an annular shape about a rotation shaft;
at least one rotor which faces an end surface of the core in an axial direction through a gap; and
a housing in which the stator and the rotor are stored, wherein the rotation shaft rotates together with the rotor, wherein a wiring fixing member is provided in an end surface and on an outer side of the stator in the axial direction, and includes an outer wall and an inner wall extending in a circumferential direction along a circumferential outer shape of the stator, the stator includes a crossover wire which leads the winding from the core unit, the crossover wire is disposed between the outer wall and the inner wall of the wiring fixing member, and at least a part of the end surface of the inner wall on a side near the stator in the axial direction abuts on the bobbin, wherein a plurality of the wiring fixing members having different circumferential lengths are provided, and wherein a wiring fixing member arranged near a lead portion is shorter in length in the circumferential direction than other wiring fixing members.

2. The axial gap rotary electric machine according to claim 1, wherein the bobbin includes a hollow portion to which the core is inserted, and a flange which extends by a predetermined length in a direction perpendicular to an outer periphery of the core, the wiring fixing member includes a projection which extends from the end surface of the outer wall on a side near the stator in the axial direction, a concave portion dent in a radial direction is provided on an outer side of the flange in the radial direction, and the projection and the concave portion are fitted.

3. The axial gap rotary electric machine according to claim 2, wherein the projection includes a shaft portion which extends in the axial direction, and an engaging portion which intersects with the shaft portion and is thicker than a width of the shaft portion.

4. The axial gap rotary electric machine according to claim 2, wherein the outer wall is thicker than the inner wall.

5. The axial gap rotary electric machine according to claim 1, wherein the stator, the wiring fixing member, and the housing are fixed by resin, and the inner wall and the outer wall of the wiring fixing member include a plurality of holes which pass through the inner and outer walls in the radial direction.

6. The axial gap rotary electric machine according to claim 1, wherein the wiring fixing member is divided into plural parts in the circumferential direction, and a circumferential length of one wiring fixing member is longer than a circumferential length of one core unit.

7. An axial gap rotary electric machine, comprising:

a stator in which a plurality of core units, the core units having a core, a winding disposed in an outer periphery of the core, and a bobbin disposed between the core and the winding, are arranged in an annular shape about a rotation shaft;

at least one rotor which faces an end surface of the core in an axial direction through a gap;

a rotation shaft which rotates together with the rotor; and a housing in which the stator and the rotor are stored, wherein the stator includes a crossover wire which leads the winding from the core unit, a wiring fixing member is provided in an end surface and on an outer side of the stator in the axial direction, and includes a hollow portion which stores the crossover wire, and a circumferential length of the wiring fixing member is longer than a circumferential length of the core unit, wherein a plurality of the wiring fixing members having different circumferential lengths are provided.

* * * * *